(12) United States Patent
Yang et al.

(10) Patent No.: US 12,337,201 B2
(45) Date of Patent: Jun. 24, 2025

(54) ENERGY STORAGE SYSTEM

(71) Applicant: LG ENERGY SOLUTION, LTD., Seoul (KR)

(72) Inventors: Mun-Seok Yang, Daejeon (KR); Yo-Hwan Kim, Daejeon (KR); Sung-Han Yoon, Daejeon (KR); Hyun-Min Lee, Daejeon (KR); Ji-Hun Kim, Daejeon (KR); Hong-Jae Park, Daejeon (KR); Ji-Won Lee, Daejeon (KR); Hyung-Uk Lee, Daejeon (KR); Seung-Jun Lee, Daejeon (KR); Tae-Shin Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/666,289

(22) Filed: May 16, 2024

(65) Prior Publication Data
US 2024/0304876 A1    Sep. 12, 2024

Related U.S. Application Data

(63) Continuation of application No. PCT/KR2023/000982, filed on Jan. 19, 2023.

(30) Foreign Application Priority Data

Jan. 19, 2022 (KR) .................. 10-2022-0008141
Jan. 17, 2023 (KR) .................. 10-2023-0006968

(51) Int. Cl.
*A62C 37/36* (2006.01)
*A62C 3/16* (2006.01)
(Continued)

(52) U.S. Cl.
CPC .............. *A62C 37/04* (2013.01); *A62C 3/16* (2013.01); *A62C 35/026* (2013.01); *H01M 10/486* (2013.01); *H01M 2010/4271* (2013.01)

(58) Field of Classification Search
CPC .. A62C 3/16; A62C 3/07; A62C 35/11; A62C 35/13; A62C 35/026; A62C 37/04;
(Continued)

(56) References Cited

U.S. PATENT DOCUMENTS

2014/0029172 A1    1/2014  Yoo
2014/0365792 A1*   12/2014 Yun ..................... H02J 7/00047
                                                              713/320
(Continued)

FOREIGN PATENT DOCUMENTS

CN    112193122 A    1/2021
CN    113611927 A    11/2021
(Continued)

OTHER PUBLICATIONS

International Search Report for PCT/KR2023/000982 (PCT/ISA/210) mailed on May 3, 2023.
(Continued)

*Primary Examiner* — Cody J Lieuwen
(74) *Attorney, Agent, or Firm* — Birch, Stewart, Kolasch & Birch, LLP

(57) ABSTRACT

An energy storage system according to an aspect of the present disclosure includes a control container having a battery system controller (BSC), a master controller connected to the BSC through a first communication line, and a bank battery management system (BBMS) connected to the BSC through a second communication line; and a battery container including a slave controller connected to the master controller through the first communication line, and a rack battery management system (RBMS) connected to the
(Continued)

BBMS through the second communication line and for monitoring a state of a corresponding battery rack.

16 Claims, 6 Drawing Sheets

(51) Int. Cl.
    *A62C 35/02*     (2006.01)
    *H01M 10/48*     (2006.01)
    *H01M 10/42*     (2006.01)

(58) Field of Classification Search
    CPC ........... H01M 10/4257; H01M 10/486; H01M 10/425; H01M 10/42; H01M 2010/4271; H01M 2010/4278; H01M 2200/103; H04L 12/46; H04L 12/40; H04L 2012/40215; H04L 2012/40228
    See application file for complete search history.

(56) References Cited

U.S. PATENT DOCUMENTS

| | | |
|---|---|---|
| 2018/0056805 A1 | 3/2018 | Shen et al. |
| 2018/0337385 A1* | 11/2018 | Schnakofsky ...... H01M 50/296 |
| 2021/0249639 A1* | 8/2021 | Shao ................... H01M 10/486 |
| 2022/0006306 A1* | 1/2022 | Lee ....................... H01M 10/48 |
| 2022/0329086 A1 | 10/2022 | Yang et al. |
| 2022/0401770 A1* | 12/2022 | Sandahl ............. H01M 50/383 |

FOREIGN PATENT DOCUMENTS

| | | |
|---|---|---|
| KR | 10-1406685 B1 | 6/2014 |
| KR | 10-2014-0143076 A | 12/2014 |
| KR | 10-2016-0055649 A | 5/2016 |
| KR | 10-1706717 B1 | 3/2017 |
| KR | 10-2045489 B1 | 11/2019 |
| KR | 10-2021-0015503 A | 2/2021 |
| KR | 10-2021-0106063 A | 8/2021 |
| WO | WO 2021/002658 A1 | 1/2021 |

OTHER PUBLICATIONS

Extended European Search Report for European Application No. 23743510.2, dated Jan. 3, 2025.

* cited by examiner

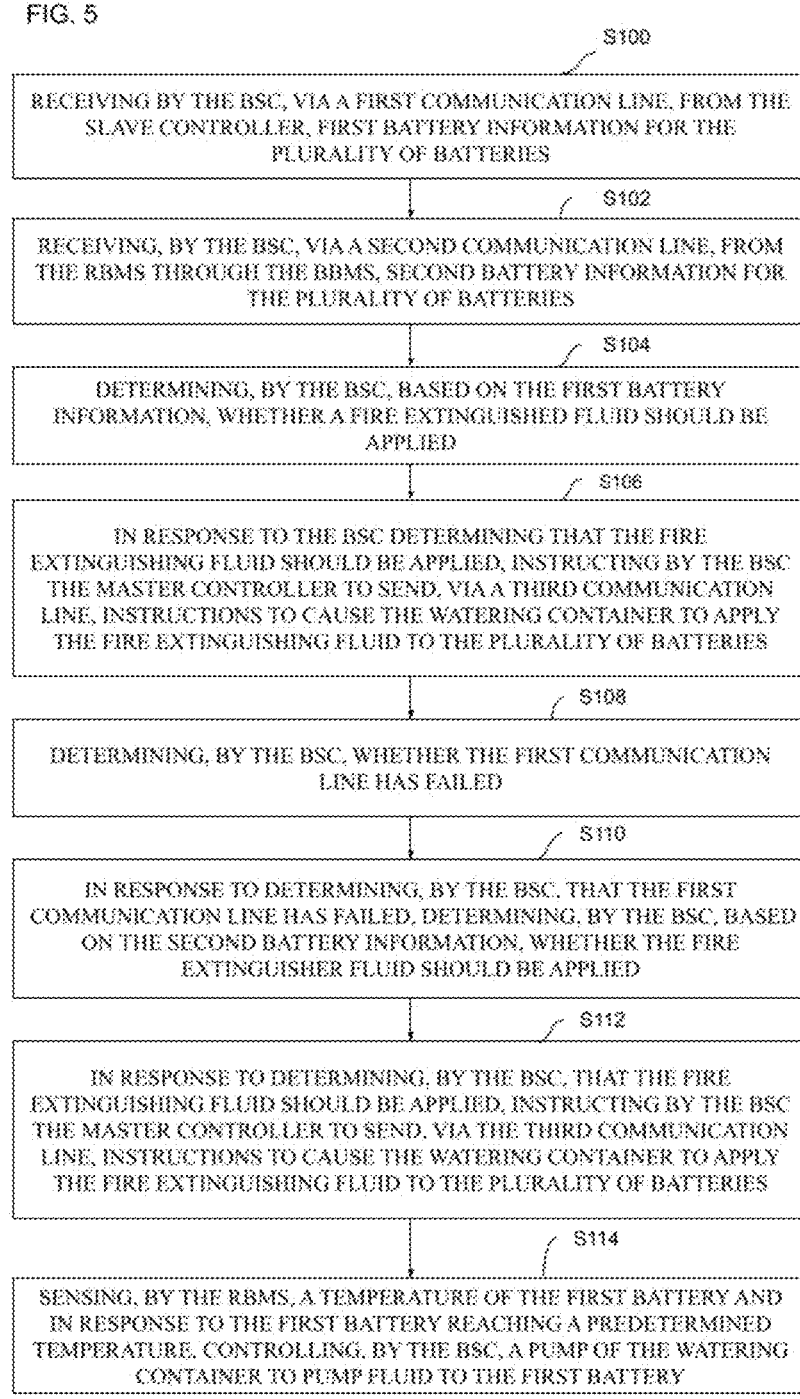

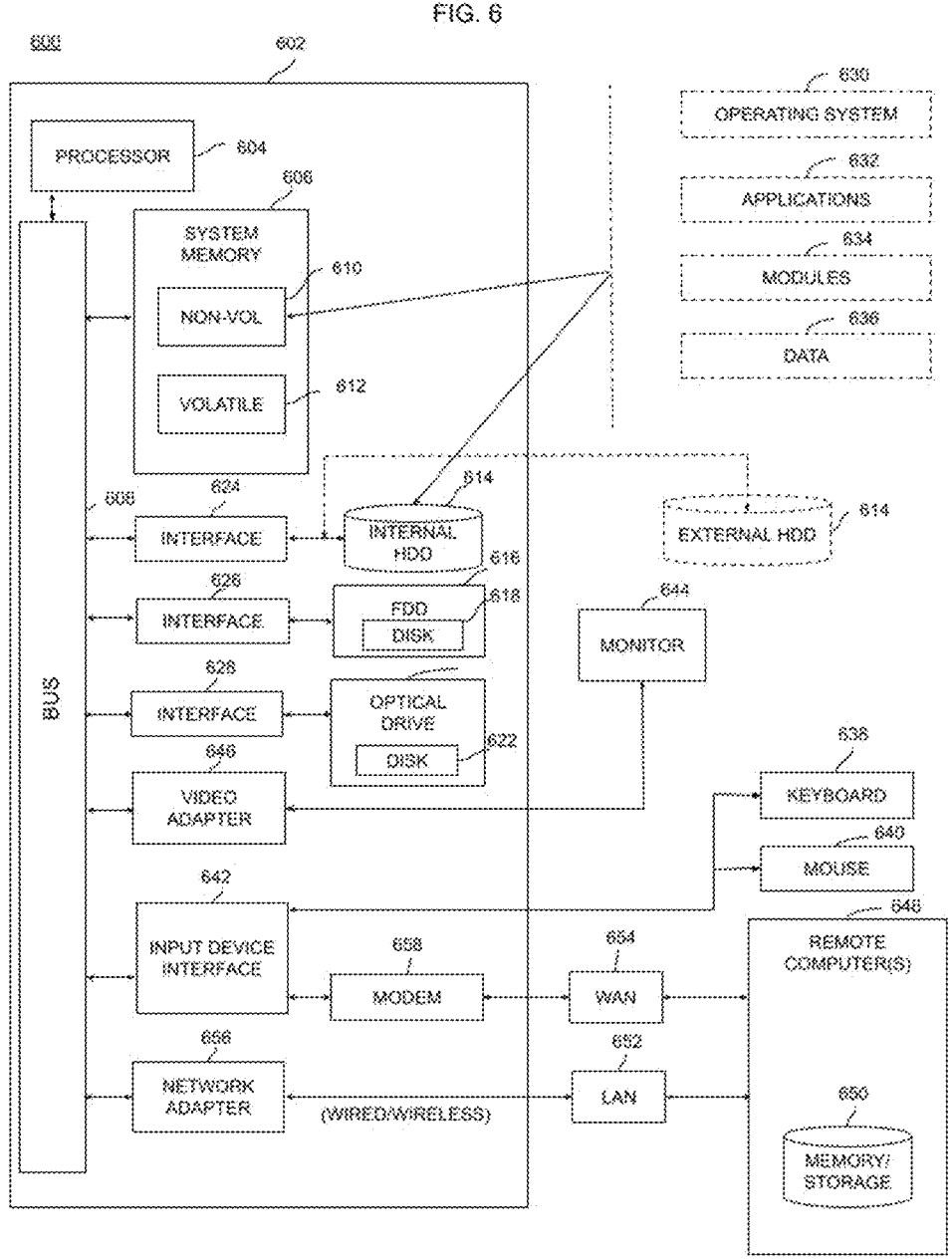

ENERGY STORAGE SYSTEM

CROSS-REFERENCE TO RELATED APPLICATIONS

The present application is a Continuation of PCT Application No. PCT/KR2023/000982 filed on Jan. 19, 2023, which claims priority to Korean Patent Application No. 10-2022-0008141 filed on Jan. 19, 2022 in the Republic of Korea and Korean Patent Application No. 10-2023-0006968 filed on Jan. 17, 2023 in the Republic of Korea, the disclosures of all of these applications being incorporated herein by reference into the present application.

BACKGROUND

Technical Field

The present disclosure relates to an energy storage system, and more particularly, to an energy storage system including a control container, e.g., housing, a battery container, and a watering container.

Description of Related Art

Recently, the demand for portable electronic products, such as notebook computers, video cameras and portable telephones has increased sharply. As such, electric vehicles, energy storage batteries, robots, satellites and the like have been developed and getting much attention. Accordingly, high-performance batteries allowing repeated charging and discharging are being actively studied.

Batteries that are commercially available at present include nickel-cadmium batteries, nickel hydrogen batteries, nickel-zinc batteries, lithium batteries and the like. Among them, the lithium batteries are prevalent since they have almost no memory effect compared to nickel-based batteries and also have very low self-discharging rate and high energy density.

An energy storage system using such a battery may be a device that stores a large amount of power and provides the stored power to a plurality of load facilities. For example, the energy storage system may be used in the form of an industrial, building or household energy management system, and/or may be used as a regular power grid and/or an emergency power grid by providing the stored power to load facilities at each point of use.

A conventional energy storage system is configured in container units (i.e., housing units), and one container includes a plurality of battery racks, a switchboard, and the like. As a result, a container of a size that may contain all components of the energy storage system is needed.

In addition, when a plurality of energy storage systems are provided, since each energy storage system is composed of an independent container, they must be independently controlled and thus each container may not control other containers (e.g., battery containers) of an energy storage system. This creates a limitation that the container-unit energy storage systems need to be controlled individually.

SUMMARY OF THE DISCLOSURE

The present disclosure is designed to solve or address the problems and other limitations associated with the related art, and therefore the present disclosure is directed to providing an energy storage system including a control container, a battery container, and a watering container in which one or more communication lines may be formed by connecting connection terminals provided in advance. For instance, the control container of the present disclosure may be connected to the various battery containers via a plurality of communication lines.

These and other objects and advantages of the present disclosure may be understood from the following detailed description and will become more fully apparent from the exemplary aspects of the present disclosure. Also, it will be easily understood that the objects and advantages of the present disclosure may be realized by the means shown in the appended claims and combinations thereof.

In one aspect of the present disclosure, there is provided a method of controlling an energy storage system, the energy storage system including a control container including a master controller, a bank battery management system (BBMS) and a battery system controller (BSC) connected to the master controller and the BBMS, a battery container including a plurality of batteries, a slave controller, and a rack battery management system (RBMS), and a watering container fluidly connected to the first battery container, the method comprising receiving by the BSC, via a first communication line, from the slave controller, first battery information for the plurality of batteries, receiving, by the BSC, via a second communication line, from the RBMS through the BBMS, second battery information for the plurality of batteries, determining, by the BSC, based on the first battery information, whether a fire extinguished fluid should be applied, in response to the BSC determining that fire extinguishing fluid should be applied, instructing by the BSC to the master controller to send, via a third communication line, instructions to cause the watering container to apply the fire extinguishing fluid to the plurality of batteries, determining, by the BSC, whether the first communication line has failed, in response to determining, by the BSC, that the first communication line has failed, determining, by the BSC, based on the second battery information, whether the fire extinguisher fluid should be applied and in response to determining, by the BSC, that the fire extinguishing fluid should be applied, instructing by the BSC to the master controller to send, via the third communication line, instructions to cause the watering container to apply the fire extinguishing fluid to the plurality of batteries.

The method may further comprise sensing, by the RBMS, a temperature of the first battery and in response to the first battery reaching a predetermined temperature, controlling, by the BSC, a pump of the watering container to pump fluid to the first battery.

The control container may include at least one of the following control elements: a HVAC (Heating, Ventilation and Air Conditioning), an uninterruptible power supply system (UPS), a door sensor, a fuse, a switch, a switching mode power supply (SMPS), a fire suppression system (FSS), a surge protection device (SPD) and an insulation monitoring device (IMD).

The method may further comprise controlling, by the master controller, the at least one of the control elements.

In one aspect of the present disclosure, there is provided an energy storage system including a battery container including a battery, a slave controller configured to control operation of the battery and a rack battery management system (RBMS), a watering container including a temperature device configured to break when the battery reaches a predetermined temperature and a pump. The RBMS may be configured to sense a temperature of the battery and in response to the battery reaching the predetermined temperature, control the pump of watering container to pump fluid to the battery.

The energy storage system may further comprise a control container including a battery system controller (BSC), a master controller connected to the BSC through a first communication line; and a bank battery management system (BBMS) connected to the BSC through a second communication line. The BSC may be a top-level controller that controls the master controller and the BBMS.

The master controller may be connected to and control at least one of the following elements included in the control container: a HVAC (Heating, Ventilation and Air Conditioning), an uninterruptible power supply system (UPS), a door sensor, a fuse, a switch, a switching mode power supply (SMPS), a fire suppression system (FSS), a surge protection device (SPD) and an insulation monitoring device (IMD).

The watering container may be connected to the master controller through a third communication line and the watering container may be configured to output a fire extinguishing fluid to the battery when a watering command is received from the master controller.

The second communication line may be for controller area network (CAN) communication.

The slave controller may be connected to and control at least one of the following elements included in the battery container: a HVAC (Heating, Ventilation and Air Conditioning), an uninterruptible power supply system (UPS), a door sensor, a gas sensor, a smoke sensor, a switch, a switching mode power supply (SMPS), a damper, a fan and a fire suppression system (FSS).

The master controller may be configured to receive battery container information from the slave controller, and the BSC may be configured to receive the battery container information from the master controller through the first communication line.

The RBMS may be configured to monitor the state of the battery, and the RBMS may be connected to a module battery management system (MBMS) through the second communication line.

The BSC may be connected to an external power conversion system (PCS) through the first communication line.

The first communication line may be for Modbus TCP/IP (transmission control protocol/Internet protocol) communication.

In one aspect of the present disclosure, there is provided an energy storage system, comprising: a control container configured to include a battery system controller (BSC); a master controller configured to be connected to the BSC through a first communication line; and a bank battery management system (BBMS) configured to be connected to the BSC through a second communication line; and a battery container configured to include a slave controller configured to be connected to the master controller through the first communication line; and a rack battery management system (RBMS) connected to the BBMS through the second communication line, the RBMS being configured to monitor a state of a corresponding battery rack.

When the battery container is provided in plurality, the master controller may be configured to be connected to a plurality of slave controllers included in the plurality of battery containers through the first communication line. The master controller may be directly connected to each of the plurality of slave controllers in a home run manner through the first communication line.

When the battery container is provided in plurality, the BBMS may be configured to be connected to a plurality of RBMSs included in the plurality of battery containers through the second communication line. The BBMS may be configured to be serially connected to the plurality of RBMSs in a daisy chain manner (e.g., serially connected) through the second communication line.

The BSC may be configured to be connected to an external power conversion system (PCS) through the first communication line. The energy storage system according to another aspect of the present disclosure may further comprise a watering container connected to the master controller through a third communication line, the watering container being configured to output a fire extinguishing fluid therein to the battery rack when a watering command is received from the master controller. The energy storage system according to another aspect of the present disclosure may further comprise a second control container including a second master controller configured to be connected to the BSC through the first communication line; and a second BBMS configured to be connected to the BSC through the second communication line.

The energy storage system according to another aspect of the present disclosure may further comprise a second battery container including a second slave controller configured to be connected to the second master controller through the first communication line; and a second RBMS connected to the second BBMS through the second communication line, the second BBMS being configured to monitor a state of a corresponding second battery rack.

The energy storage system according to another aspect of the present disclosure may further comprise a second watering container connected to the second master controller through a third communication line, the second watering container being configured to output a fire extinguishing fluid therein to the second battery rack when a watering command is received from the second master controller.

According to one aspect of the present disclosure, there is an advantage of improving communication stability of an energy storage system by connecting communication lines of the energy storage system using a home run manner and a daisy chain manner (e.g., serially connected).

In addition, according to one aspect of the present disclosure, there is an advantage in that the battery container may be easily expanded in the energy storage system.

The effects of the present disclosure are not limited to the above, and other effects not mentioned herein will be clearly understood by those skilled in the art from the appended claims.

BRIEF DESCRIPTION OF THE DRAWINGS

The accompanying drawings illustrate various aspects of the present disclosure and together with the foregoing disclosure, serve to provide further understanding of the technical features of the present disclosure, and thus, the present disclosure is not construed as being limited to the drawings.

FIG. 5 is a block diagram illustrating a method of controlling an energy storage system according to an aspect of the present disclosure.

FIG. 6 illustrates an example of a computing architecture according to an aspect of the present disclosure.

DETAILED DESCRIPTION OF THE DISCLOSURE

Figure 1:
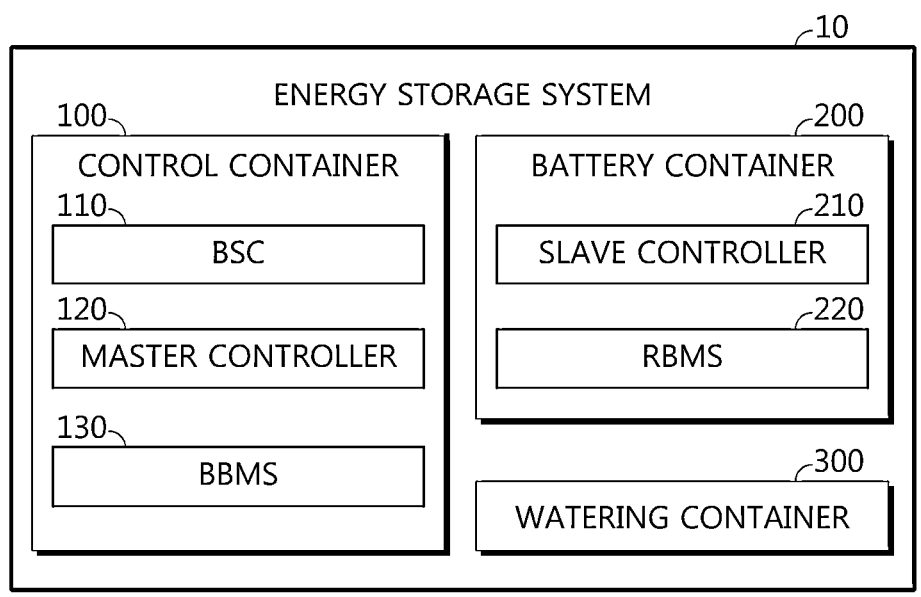
FIG. 1 is a diagram schematically showing an energy storage system according to an aspect of the present disclosure.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein. Features of various aspects of the present disclosure may be partially or entirely coupled to or combined with each other and may be operated, linked, or driven together in various ways. Aspects of the present disclosure may be carried out independently from each other, or may be carried out together in co-dependent or related relationship. In one or more aspects, the components of each apparatus, device, system, etc. according to various aspects of the present disclosure are operatively coupled and configured.

The terms including the ordinal number such as "first", "second" and the like, may be used to distinguish one element from another among various elements, but not intended to limit the elements by the terms. It will be understood that, although the terms "first," "second," or the like may be used herein to describe various elements, these elements should not be limited by these terms, for example, to any particular order, sequence, precedence, or number of elements. These terms are only used to distinguish one element from another. For example, a first element could be termed as a second element, and, similarly, a second element could be termed as a first element, without departing from the scope of the present disclosure.

Throughout the specification, when a portion is referred to as "comprising," "having," or "including" any element, it means that the portion may include other elements further, without excluding other elements, unless specifically stated otherwise. Further, embodiments are example embodiments and aspects are example aspects. The term "may" can be interchangeably used with the term "can." Any implementation described herein as an "exemplary" or "example" is not necessarily to be construed as preferred or advantageous over other implementations. In addition, the term "embodiment" may be interchangeably used with the term "aspect" or "example".

In addition, throughout the specification, when a portion or element is referred to as being "connected" (or the like) to another portion or element, it is not limited to the case that they are "directly connected", but it also includes the case where they are "indirectly connected" with one or more other portions or elements being interposed between them. Further, the term "module" can be a unit, a part, a portion, a device, a structure, etc. Furthermore, the phrase "communication line" can be referred to a physical (wired) line, a wireless line, a short term range communication line, a Bluetooth communication line, etc.

Hereinafter, the aspects of the present disclosure will be described in detail with reference to the accompanying drawings.

Figure 2:
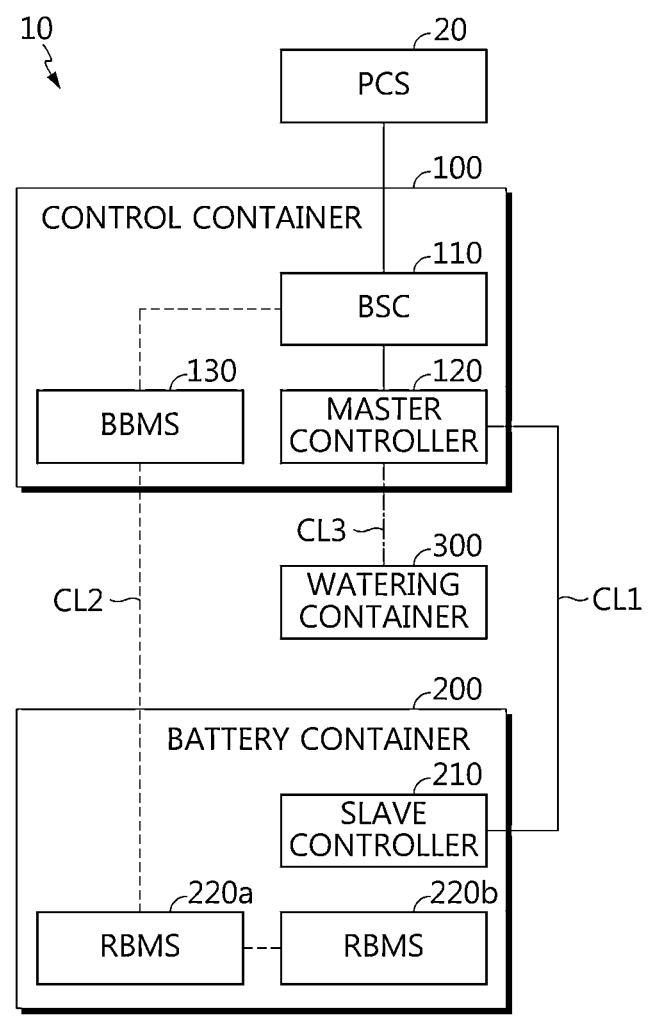
FIG. 2 is a diagram schematically showing a first example of the energy storage system according to an aspect of the present disclosure.

FIG. 1 is a diagram schematically showing an energy storage system 10 according to an aspect of the present disclosure. FIG. 2 is a diagram schematically showing a first example of the energy storage system 10 according to an aspect of the present disclosure.

Referring to FIGS. 1 and 2, the energy storage system 10 may include a control container 100, a battery container 200. Each of the control container 100 and the battery container 200 may be in the form of a housing, which may be comprised of any material, such as metal, plastic or ceramic. The control container 100 and the battery container 200 protect the various components disposed therein from environmental hazards and provide resistance to fire, damage and/or corrosion. The energy storage system 10 may further include a watering container 300. The battery container 200 may include a slave controller 210 and a rack battery management system (RBMS) 220.

The energy storage system 10, according to an aspect of the present disclosure, may be expressed as DC-LINK, and DC-LINK may refer to a DC-Link capacitor, which is a known device and can power many power electronic circuits. Also, the control container 100 may be expressed as E-LINK or electronic-link, and the battery container 200 may be expressed as B-LINK or battery-link.

The control container 100 may include a battery system controller (BSC) 110, a master controller 120, and a bank battery management system (BBMS) 130.

The BSC 110 is a top-level controller and may be communicatively connected to the master controller 120 and the BBMS 130 (also referred to herein as a BBMS controller). For instance, the BSC 110 may be directly electrically connected to the master controller 120 and the BBMS controller 130. The BBMS controller 130 may be configured to control operations of the battery module(s)/battery rack(s) or other batteries which may be contained within the battery container 200. Operations may include, but are not limited to, monitoring the state of charge (SOC) of the battery module(s)/battery rack(s), balancing battery cells within the battery module(s)/battery rack(s) (e.g., control charging and discharging of individual battery cells to match their voltages), monitoring temperature, reporting battery status, etc. The operation of balancing the battery cells may be based on battery information, and the battery information (i.e., first and/or second battery information) may include voltage, current, temperature, SOC, state of health (SOH), and any other known characteristic of each of the battery cells. Alternatively, the RBMS 220 may perform the above-noted operations, and may report this information (e.g., cell temperature, cell voltage, SOC, SOH, etc.) to the master controller 120 and/or the BBMS 130. Each of the BBMS 130 and the RBMS 220 may include conventional elements, such as switches, relays, accumulators (e.g., capacitors), hardware embedded memory and at least one hardware embedded processor, for determining which of the battery cells (e.g., for the corresponding battery container) needs to be charged/discharged and for executing its charging/discharging operations.

The BSC 110 may receive battery information from the BBMS 130 and the RBMS 220 (e.g. the RBMS(s) of each battery container), and may control the battery/batteries of each battery container 200 through the BBMS 130, where the BBMS 130 is in communication to each of the RBMSs 220 via a second communication line CL2. That is, upon the BSC 110 receiving battery information of the battery/batteries of each battery container, the BSC 110 may send a signal (e.g., control signal) to the BBMS 130, and the BBMS 130 may in-turn send signal(s) (e.g., control signals) to the corresponding RBMS's to control the operation of the corresponding one or more batteries of each battery container 200. The signal sent from the BSC 110 to the BBMS 130 may be designated as a first control signal, and the signal sent from the BBMS 130 to the RBMS may be designated as a second control signal (or second control signals when signals are sent to a plurality of RBMSs).

In addition, the BSC 110 may be configured to be connected to an external power conversion system (PCS) 20 through a first communication line CL1. For example, the first communication line CL1 may be a communication line applied to a first communication protocol. As a specific example, the first communication line CL1 may be a communication line for Modbus TCP/IP (transmission control protocol/Internet protocol) communication, but other types of communication lines or protocol can be used.

Figure 3:
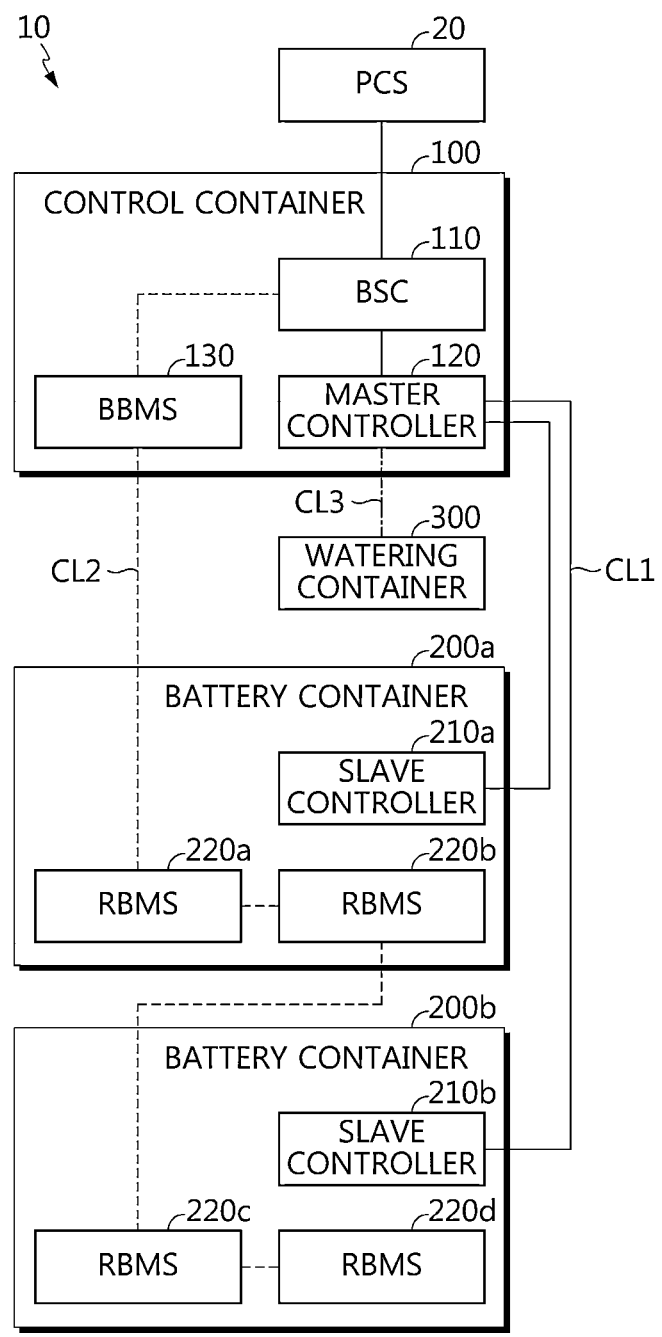
FIG. 3 is a diagram schematically showing a second example of the energy storage system according to an aspect of the present disclosure.

Alternatively, the BSC 110 may additionally perform the functions of the BBMS 130 (e.g., communicate with the various RBMSs) and the master controller 130 (e.g., communicate with the various slave controllers and the watering container), and thus may be connected (e.g., directly connected) to the slave controllers 210a, 210b of all the other battery containers 200a, 200b via a first communication line CL1 and the BSC 110 may be connected to the BBMS 130 and the RBMS 220 (e.g., 220a, 220b, 220c, 220d) of all the other battery containers 200 via the second communication line CL2 (e.g., see FIG. 3).

The BSC 110 may be connected to the watering container 300 via a third communication line CL3. For example, the BSC 110 may be connected to all of the watering containers, if there are multiple watering containers, via the third communication line CL3 (e.g., see FIG. 4).

In the example of FIG. 2, the BSC 110 may be communicatively connected to the PCS 20 through the first communication line CL1 or another communication line. The master controller 120 may be configured to be connected to the BSC 110 through the first communication line CL1 or another communication line.

Here, the master controller 120 is a programmable logic controller (PLC) included in the E-LINK and may be expressed as E-PLC or electronic PLC or an ethernet-based PCL. That is, the master controller 120 may be connected to components, such as a HVAC (Heating, Ventilation and Air Conditioning), an uninterruptible power supply system (UPS), a door sensor, a fuse, a switch, a switching mode power supply (SMPS), a fire suppression system (FSS), a surge protection device (SPD), an insulation monitoring device (IMD), and the like which may be included in the control container 100 and control these components. Also, the master controller 120 may transmit control container information obtained from these components to the BSC 110 through the first communication line CL1. That is, the BSC 110 may receive the control container information obtained by the master controller 120 through the first communication line CL1. Also, the BSC 110 may control the master controller 120 to control each component included in the control container 100 based on the control container information.

For example, in the example of FIG. 2, the master controller 120 may be communicatively connected to the BSC 110 through the first communication line CL1. That is, the PCS 20, the BSC 110, and the master controller 120 may be connected to each other through the first communication line CL1, but other variations are possible.

The BBMS 130 may be configured to be connected to the BSC 110 through the second communication line CL2. For example, the second communication line CL2 may be a communication line applied to a second communication protocol. As a specific example, the second communication line CL2 may be a communication line for controller area network (CAN) communication, but other types of communications lines or protocols can be used.

In the example of FIG. 2, the BSC 110 may be connected to the master controller 120 and the BBMS 130 through different communication lines, e.g., through the first and second communication lines CL1 and CL2. Therefore, even if a defect occurs in one communication line, the BSC 110 may continue communication through the remaining communication line.

As mentioned above, the battery container 200 may include the slave controller 210 and the rack battery management system (RBMS) 220. Unlike the control container 100, the battery container 200 may not include the BSC 110.

The slave controller 210 may be configured to be connected to the master controller 120 through the first communication line CL1. Here, the slave controller 210 is a programmable logic controller (PLC) included in the B-LINK and may be expressed as B-PLC or a battery PCL. The slave controller 210 includes a central processing unit (CPU) that executes a control program, input/output (I/O) module(s), memory that stores control program and data and a programming device used to create and modify the control program. That is, the slave controller 210 may be connected to a HVAC, an UPS, a door sensor, a gas sensor, a smoke sensor, a switch, a SMPS, a damper, a fan, a FSS, and the like which may be included in the battery container 200 and control these components. Also, the slave controller 210 may transmit battery container information obtained from these components to the master controller 120 through the first communication line CL1. Also, the BSC 110 may receive the battery container information obtained by the master controller 120 through the first communication line CL1. That is, the BSC 110, the master controller 120, and the slave controller 210 may be connected to each other through the first communication line CL1. Also, the BSC 110 may control the slave controller 210 to control each component included in the battery container 200 based on the battery container information.

The RBMS 220 may be configured to be connected to the BBMS 130 through the second communication line CL2 and monitor the state of the corresponding battery rack.

Specifically, the battery container 200 may include at least one battery rack, but may contain other types of batteries or battery structures such as a battery pack. Also, each battery rack may include at least one battery module. The state of the battery module may be monitored by a module battery management system (MBMS) or by the BBMS 130. In addition, at least one MBMS or at least one BBMS 130 may be connected to the corresponding RBMS 220 through the second communication line CL2. That is, the RBMS 220 may monitor the state of the battery rack and the state of the battery module which may be included in the battery rack.

The BBMS 130 included in the control container 100 may be connected to the RBMS 220 included in the battery container 200 using the second communication line CL2 or other communication line. Also, the BBMS 130 may receive information of the corresponding battery rack from at least one RBMS 220 included in the battery container 200.

For example, in the aspect of FIG. 2, the battery container 200 may include two RBMSs 220a, 220b, being a first RBMS 220a and a second RBMS 220b. The second RBMS 220b may be provided as a redundancy measure, in an instance in which the first RBMS 220a malfunctions, and the second RBMS 220b may have a connection to the BBMS 130 that is independent of the connection of the first RBMS 220a to the BBMS 130. Alternatively, the first RBMS 220a may be used to monitor and/or control operation of a first set of batteries which may be disposed within the battery container 200 (or can be disposed elsewhere) and the second RBMS 220b may be used to monitor and/or control operation of a second set of batteries which may be disposed within the battery container 200 (or can be disposed elsewhere), the second set of batteries being different from (e.g., distinct from) the first set of batteries. The RBMS 220a may be connected to the BBMS 130 through the second communication line CL2. Also, the RBMS 220a may be connected to the RBMS 220b through the second communication line CL2. For example, the BSC 110 and the BBMS 130 included in the control container 100 may be communicatively connected to the RBMSs 220a, 220b included in the battery container 200 through the second communication line CL2.

That is, the energy storage system 10 according to an aspect of the present disclosure may include the first communication line CL1 connecting the BSC 110, the master controller 120 and the slave controller 210, and the second communication line CL2 connecting the BSC 110, the BBMS 130 and the RBMS 220, respectively. The first communication line CL1 may additionally be connected to the slave controller 210, such that even if a defect occurs in any one communication line, communication is not interrupted and may be continued through the other communication line(s).

For example, even if a problem occurs in the first communication line CL1, such that communication between the master controller 120 and the slave controller 210 is not performed, the BBMS 130 may still normally receive battery rack information or other information for the battery container(s) from the RBMS 220 through the second communication line CL2. For instance, when the first communication line CL1 is severed or otherwise damaged such that the master controller 120 may not communicate with the slave controller 210 properly, the operation of the batteries of the various battery containers may still be controlled by the BSC 110 through the second communication line(s) CL2. Therefore, the energy storage system 10 has an advantage of establishing independent communication paths through different communication lines in consideration of communication targets and communication purposes. Therefore, stable communication may be performed in the energy storage system 10.

Alternatively, any or all of the slave controllers 210 may be connected to the watering container 300, via the first communication line CL1 or the third communication line CL3, to control the watering container 300 to pump fluid (e.g., fire extinguishing fluid), or alternatively, a gas, to a corresponding battery to cool the battery and/or extinguish a fire in the battery. For example, both (or one of) the master controller 120 of the control container 100 and the slave controller 210 of any or all of the battery containers 200 may control the watering container 300 to pump fluid/gas, as set forth above. For instance, each slave controller 210 may be directly connected to a smoke sensor of the respective battery container 200, and upon the smoke sensor detecting smoke in a particular battery container 200, the respective slave controller 210 may control the watering container 300 to pump fluid directly to the one or more batteries of the particular battery container 200.

Therefore, the present disclosure provides redundant measures for extinguishing a fire of a battery/batteries of a battery container 200, including a first method of sensing battery temperature(s) received from the RBMS 220, and sent from the RBMS 220 to the BBMS 130, and sending this data from the BBMS 130 to the BSC 110, where the BSC 110 controls the watering container 300, either directly or through the master controller 120 to pump fire extinguishing fluid/gas to the corresponding one or more batteries having the elevated temperature to extinguish a fire or to otherwise cool the one or more batteries. A second method of extinguishing a fire includes detecting smoke via a smoke sensor and/or detecting temperature of the batteries or battery housing via a temperature sensor, where the smoke sensor data and/or temperature data is sent directly from the smoke sensor and/or temperature sensor to the respective slave controller 210, and the slave controller 210 may directly control operation of the watering container 300 to send fire extinguishing fluid/gas to the respective one or more batteries to extinguish a fire or otherwise cool the batteries.

The fire extinguishing fluid may include water, or any known fire extinguishing material. Instead of a fluid, a gas or foam may be used. For instance, carbon dioxide, bromochlorodifluoromethane (Halon 1211), sodium bicarbonate base and potassium bicarbonate base, solutions of water and potassium acetate, potassium carbonate, potassium citrate, or a combination of these chemicals, etc. can be used.

FIG. 3 is a diagram schematically showing the second example of the energy storage system 10 according to an aspect of the present disclosure. Specifically, the example of FIG. 3 is an aspect in which another battery container 200b is further added to the example of FIG. 2.

When the battery container 200 is provided in plurality, the master controller 120 may be configured to be connected to a plurality of slave controllers 210 (210a, 210b) included in the plurality of battery containers 200 (200a, 200b) through the first communication line CL1.

Specifically, the master controller 120 may be configured to be directly connected to each of the plurality of slave controllers 210 through the first communication line CL1. For example, the master controller 120 may be configured to be directly connected to each of the plurality of slave controllers 210 through the first communication line CL1 in a home run manner (e.g., home run manner refers to each electrical circuit from the slave controllers 210 is run directly back to the master controller 120). Alternatively, a daisy chain configuration may be used, in which the master controller 120 is connected to the plurality of slave controllers 210 in sequence. Here, a daisy chain refers to a wiring scheme in which multiple devices are wired together in sequence. This may be done for power, analog signals, digital data, or a combination thereof.

In the example of FIG. 3, the master controller 120 may be directly connected to the slave controller 210a included in the battery container 200a through the first communication line CL1. Also, the master controller 120 may be directly connected to the slave controller 210b included in the battery container 200b through the first communication line CL1 which may be different from the first communication CL1 associated with the slave controller 210a. As such, the communication structure between the master controller 120 and the slave controller 210a may not affect the communication structure between the master controller 120 and the slave controller 210b.

Also, when the battery container 200 is provided in plurality, the BBMS 130 may be configured to be connected to the plurality of RBMSs 220 included in the plurality of battery containers 200 through the second communication line CL2.

Specifically, the BBMS 130 may be configured to be serially connected to the plurality of RBMSs 220 through the second communication line CL2. The BBMS 130 may be serially connected to the plurality of RBMSs 220 through the second communication line CL2, for example in a daisy chain manner as described above.

In the example of FIG. 3, the BBMS 130 may be connected to the RBMS 220a included in the battery container 200a through the second communication line CL2. Also, the RBMS 220a may be connected to the RBMS 220b through the second communication line CL2. Also, the RBMS 220b may be connected to the RBMS 220c included in the battery container 200b through the second communication line CL2. Also, the RBMS 220c may be connected to the RBMS 220d through the second communication line CL2. That is, the BSC 110, the BBMS 130, the RBMS 220a, the RBMS 220b, the RBMS 220c, and the RBMS 220d may be connected through the second communication line CL2.

The energy storage system 10 according to an aspect of the present disclosure has an advantage of improving stability of each communication path by giving independence to the communication path along the first communication line CL1 and the communication path along the second communication line CL2.

Referring back to FIG. 1, the energy storage system 10 may include the watering container 300. Specifically, the watering container 300 may include a water injection device capable of outputting a fire extinguishing fluid to the battery container 200 when a fire occurs in the battery container 200. The water injection device may include a pump (e.g., any known water pump, such as a centrifugal pump, a submersible pump, etc.) and a nozzle to inject fluid into the battery container 200 (or other designated area), and may include corresponding piping (e.g., piping comprising of copper, polyvinyl chloride (PVC), or any other known piping material) connected between the watering container 300 and the battery container 200. Also, the watering container 300 may be expressed as a water injection unit (WIU). As mentioned above, the watering container 300 can output water, but other fluids or gas can be output.

The watering container 300 may be connected to the master controller 120 through the third communication line CL3, and may output a fire extinguishing fluid therein to a battery rack or battery(ies) when a watering command is received from the master controller 120.

For example, the watering container 300 may further include a control unit (e.g., a hardware embedded processor) and a watering unit. When receiving a watering command from the master controller 120, the control unit of the watering container 300 may control the watering unit to output a fire extinguishing fluid/gas.

In addition, the watering unit may be connected to the RBMS 220 included in the battery container 200 through a pipeline (e.g., a pipeline for liquids, such as CPVC, copper, stainless steel and the like). Specifically, the watering unit may be connected to each battery module included in the RBMS 220 through a pipeline. Here, a breakable bulb (e.g., temperature device) may be provided in the pipeline, for example, to seal the pipeline (e.g., pipe or tube). That is, the breakable bulb may be thermostatic expansion valve (TXV), which is a temperature-controlled valve that is used in hot water heating systems and has a sensing bulb that is filled with a liquid that expands and contracts with temperature changes. When the water temperature reaches a certain point, the liquid in the sensing bulb expands and opens the valve, allowing more water to flow to the coils. This keeps the water temperature at a constant level. For example, the bulb may be configured to be damaged according to the temperature of the battery rack or battery module connected thereto. For example, when the temperature of the battery rack or battery module reaches a predetermined temperature (e.g., too high of a temperature), the bulb may be designed to break intentionally, thereby allowing water or other fire extinguishing liquid to flow from the watering container 300 to the battery container 200. Such liquid will flow when the control unit of the watering container 300 sends a command (e.g., watering command) to the watering unit to start the pump to cause the flow of the liquid to the battery container 200 to extinguish a fire or otherwise cool the battery module/battery rack to a predetermined temperature.

For example, when a fire occurs in the battery container 200, the control unit of the watering container 300 (e.g., the watering container corresponding to each battery container) may receive a watering command from the master controller 120. The control unit may control the watering unit so that the watering unit outputs a fire extinguishing fluid to the pipeline. In this case, since the bulb is broken in the pipeline corresponding to the battery module where the fire occurs, the fire extinguishing fluid may be introduced into the battery module through the pipeline.

In the example of FIG. 3, the master controller 120 may be communicatively connected to the watering container 300 through the third communication line CL3. For example, the third communication line CL3 may be a communication line applied to a third communication protocol. As a specific example, the third communication line CL3 may be a communication line for Modbus RTU communication or other types of communication line or protocol.

Accordingly, the energy storage system 10 according to an aspect of the present disclosure has an advantage of securing communication stability for each communication path by establishing independent communication paths using each of the first communication line CL1, the second communication line CL2, and the third communication line CL3.

Figure 4:
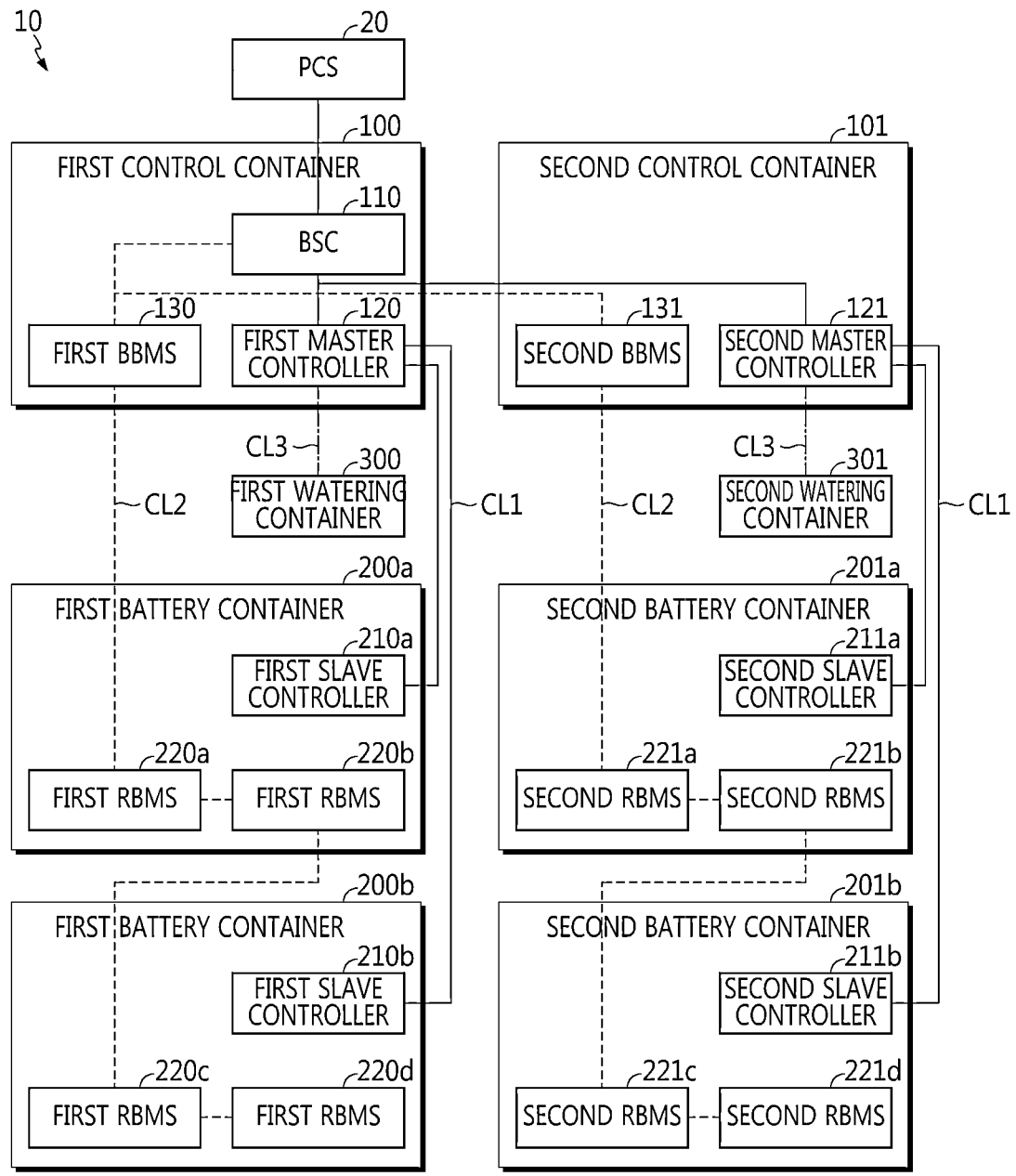
FIG. 4 is a diagram schematically showing a third example of the energy storage system according to an aspect of the present disclosure.

FIG. 4 is a diagram schematically showing the third example of the energy storage system 10 according to an aspect of the present disclosure. In this example, two control containers, four battery containers and two watering containers are shown, but any other plural number(s) of control containers, battery containers and watering containers can be used, which are covered by the present disclosure.

Referring to FIG. 4, the energy storage system 10 may include a plurality of control containers 100, 101, a plurality of battery containers 200a, 200b, 201a, 201b and a plurality of watering containers 300, 301. Specifically, the energy storage system 10 according to the aspect of FIG. 4 may further include a second control container 101, second battery containers 201a, 201b, and a second watering container 301 in the energy storage system 10 according to the example of FIG. 3.

The second control container 101 may be configured to include a second master controller 121 and a second BBMS 131.

Specifically, the second master controller 121 may be configured to be connected to the BSC 110 through the first communication line CL1. That is, the BSC 110 included in the first control container 100 may not be included in the second control container 101.

For example, in the example of FIG. 4, the BSC 110 may be included in the first control container 100 for managing multiple control containers and for managing multiple battery management systems (e.g., BBMS 130, RBMS 220*a*, RBMS 220*b*, RBMS 220*c*, RBMS 220*d*, etc.) or may be for managing only the BBMS 130 in in the first control container 100. Also, the first master controller 120 and the second master controller 121 may be communicatively connected to the BSC 110 through the first communication line CL1. That is, even if a plurality of control containers 100, 101 are provided in the energy storage system 10, the BSC 110, which is a top-level controller, may be included in only one control container 100.

For example, the first master controller 120 may transmit information of the first control container obtained from components included in the first control container 100 to the BSC 110 through the first communication line CL1. Independently, the second master controller 121 may transmit information of the second control container obtained from components included in the second control container 101 to the BSC 110 through the first communication line CL1. The BSC 110 may control the first master controller 120 to control each component included in the first control container 100 based on the information of the first control container. In addition, the BSC 110 may control the second master controller 121 to control each component included in the second control container 101 based on the information of the second control container.

The second BBMS 131 may be configured to be connected to the BSC 110 through the second communication line CL2. In the example of FIG. 4, the second BBMS 131 may be connected to the BSC 110 through the second communication line CL2.

The second battery container 201 may include a second slave controller 211 and a second RBMS 221. In the example of FIG. 4, the first control container 100 may be connected to the first battery containers 200*a*, 200*b*, and the second control container 101 may be connected to the second battery containers 201*a*, 201*b*.

The second slave controller 211 may be configured to be connected to the second master controller 121 through the first communication line CL1. In addition, the second RBMS 221 may be configured to be connected to the second BBMS 131 through the second communication line CL2 and monitor the state of the corresponding second battery rack.

The second watering container 301 may be configured to be connected to the second master controller 121 through the third communication line CL3, and output a fire extinguishing fluid therein to the second battery rack when a watering command is received from the second master controller 121.

Specifically, the communication structure between the master controller 121 and the slave controller 211, the communication structure between the BBMS 131 and the RBMS 221, and the communication structure between the master controller 121 and the watering container 301 may be the same as the communication structure described above. For example, in FIG. 4, in the same way that the first master controller 120 and the first slave controllers 210*a*, 210*b* are connected through the first communication line CL1, the second master controller 121 and the second slave controllers 211*a*, 211*b* may be connected through the first communication line CL1. In addition, in the same way that the first BBMS 130 and the first RBMSs 220*a*, 220*b*, 220*c*, 220*d* are connected through the second communication line CL2, the second BBMS 131 and the second RBMSs 221*a*, 221*b*, 221*c*, 221*d* may be connected through the second communication line CL2. Also, in the same way that the first master controller 120 and the first watering container 300 are connected through the third communication line CL3, the second master controller 121 and the second watering container 301 may be connected through the third communication line CL3.

The energy storage system 10 according to an aspect of the present disclosure has a structural feature in which the control containers 100, 101, the battery containers 200, 201, and the watering containers 300, 301 may be extended and connected. Therefore, as needed, more battery containers 200, 201 may be connected to the energy storage system 10, and the energy storage system 10 may be overall monitored and controlled through one BSC 110. That is, the energy storage system 10 has an advantage of not only being scalable but also being capable of integrally controlled and managed through one BSC 110.

FIG. 5 illustrates a method of controlling (e.g., operating) an energy storage system according to an aspect of the present disclosure. This method can be implemented in any energy storage system according to various aspects of the present disclosure.

Referring to FIG. 5, in one example, in step S100, the BSC 110 may receive, via the first communication line CL1, from the slave controller 210, first battery information for a plurality of batteries of one or more battery containers 200.

In step S102, the BSC 110 may receive, via the second communication line CL2, from the RBMS 220 through the BBMS 130, second battery information for the plurality of batteries.

In step S104, the BSC 110 may determine, based on the first battery information, whether the fire extinguished fluid (or gas) should be applied to the batteries.

In step S106, in response to the BSC 110 determining, based on the first battery information, that fire extinguishing fluid should be applied, the BSC 110 may send a signal to the master controller 120 that instructs the master controller 120 to send, via a third communication line CL3, instructions to cause the water pump of the watering container 300 to apply the fire extinguishing fluid to the plurality of batteries.

In step S108, the BSC 110 may determine whether the first communication line CL1 has failed, or due to a failure of the BBMS 130, the RBMS 220, or the plurality of batteries, after determining, by the BSC 110, that the first communication line CL1 has failed.

In step S110, the BSC 110 may determine, based on the second battery information, whether the fire extinguisher fluid should be applied.

In step S112, in response to determining, by the BSC 110, that the fire extinguishing fluid should be applied, based on the second battery information, the BSC 110 may send a signal to the master controller 120 that instructs the master controller 120 to send, via the third communication line CL3, instructions to cause the water pump to apply the fire extinguishing fluid (or gas) to the plurality of batteries.

In step S114, the RBMS 220 may sense a temperature of the first battery and in response to the first battery reaching a predetermined temperature, and the BSC 110 may control the pump of the watering container to pump fluid to the first battery.

FIG. 6 illustrates an example of a computing architecture 600 comprising a computing system 602 that may be suitable for implementing various aspects of the present disclosure as described above.

Referring to FIG. 6, in various aspects, the computing architecture 600 may comprise or be implemented as part of an electronic device. In some aspects, the computing architecture 600 may be representative, for example, of a system that implements one or more components of the energy storage system 10 of the present disclosure. In some aspects, the computing system 602 may be representative, for example, of a contactless card, mobile devices, and a server. The aspects are not limited in this context. More generally, the computing architecture 600 is configured to implement all logic, applications, systems, methods, apparatuses, and functionality described herein with reference to the figures of the present application.

As used in this application, the terms "system" and "component" and "module" are intended to refer to a computer-related entity, either hardware, a combination of hardware and software, software, or software in execution, examples of which are provided by the exemplary computing architecture 600. For example, a component may be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information may be implemented as signals allocated to various signal lines. In such allocations, each message is a signal. Further aspects, however, may alternatively employ data messages. Such data messages may be sent across various connections. Exemplary connections include parallel interfaces, serial interfaces, and bus interfaces.

The computing system 602 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The aspects, however, are not limited to implementation by the computing system 602.

As shown in FIG. 6, the computing system 602 comprises a processor 604, a system memory 606 and a system bus 608. The processor 604 may be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 604.

The system bus 608 provides an interface for system components including, but not limited to, the system memory 606 to the processor 604. The system bus 608 may be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the aspect shown in FIG. 6, the system memory 606 may include non-volatile memory 610 and/or volatile memory 612. A basic input/output system (BIOS) may be stored in the non-volatile memory 610.

The computing system 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 may be connected to the system bus 608 by a HDD interface 624, an FDD interface 626 and an optical drive interface 628, respectively. The HDD interface 624 for external drive implementations may include at least one or both of Universal Serial Bus (USB) and IEEE 1394 interface technologies. The computing system 602 is generally configured to implement all logic, systems, methods, apparatuses, and functionality described herein with reference to the figures of the present application.

The drives and associated computer-readable media provide volatile and/or nonvolatile storage of data, data structures, computer-readable instructions, computer-executable instructions, and so forth. For example, a number of program modules may be stored in the drives and memory units 610, 612, including an operating system 630, one or more application programs 632, other program modules 634, and program data 636. In one aspect, the one or more application programs 632, other program modules 634, and program data 636 may include, for example, the various applications and/or components of the systems of the present application.

A user may enter commands and information into the computing system 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 604 through an input device interface 642 that is coupled to the system bus 608, but may be connected by other interfaces such as a parallel port, IEEE 1394 serial port, a game port, a USB port, an IR interface, and so forth.

A monitor 644 or other type of display device is also connected to the system bus 608 via an interface, such as a video adapter 646. The monitor 644 may be internal or external to the computing system 602. In addition to the monitor 644, a computer typically includes other peripheral output devices, such as speakers, printers, and so forth.

The computing system 602 may operate in a networked environment using logical connections via wire and/or wireless communications to one or more remote computers, such as a remote computer 648. The remote computer 648 may be a workstation, a server computer, a router, a personal computer, portable computer, microprocessor-based entertainment appliance, a peer device or other common network node, and typically includes many or all of the elements described relative to the computing system 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computing system 602 is connected to the LAN 652 through a wire and/or wireless communication network interface or adapter 656. The adapter 656 may facilitate wire and/or wireless communications to the LAN 652, which may also include a wireless access point disposed thereon for communicating with the wireless functionality of the adapter 656.

When used in a WAN networking environment, the computing system 602 may include a modem 658, or is connected to a communications server on the WAN 654, or has other means for establishing communications over the WAN 654, such as by way of the Internet. The modem 658, which may be internal or external and a wire and/or wireless device, connects to the system bus 608 via the input device interface 642. In a networked environment, program modules depicted relative to the computing system 602, or portions thereof, may be stored in the remote memory/storage device 650. It will be appreciated that the network connections shown are exemplary and other means of establishing a communications link between the computers may be used.

The computing system 602 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ M wireless technologies, among others. Thus, the communication may be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network may be used to connect computers to each other, to the Internet, and to wire networks (which use IEEE 802.3-related media and functions).

Various aspects described herein may be implemented in a computer-readable medium using, for example, software, hardware, or some combination thereof. For example, the aspects described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such aspects are implemented by the controller. That is, the controller is a hardware-embedded processor executing the appropriate algorithms (e.g., flowcharts) for performing the described functions and thus has sufficient structure. Also, the aspects such as procedures and functions may be implemented together with separate software modules each of which performs at least one of functions and operations. The software codes may be implemented with a software application written in any suitable programming language. Also, the software codes may be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

One or more aspects of the present disclosure may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some aspects may be implemented, for example, using a machine-readable medium or article which may store an instruction or a set of instructions that, if executed by a machine, may cause the machine to perform a method and/or operations in accordance with the aspects. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description has been presented for purposes of illustration. It is not exhaustive and is not limited to the precise forms or aspects disclosed. Modifications and adaptations of the aspects will be apparent from consideration of the specification and practice of the disclosed aspects. For example, the described implementations include hardware and software, but systems and methods consistent with the present disclosure may be implemented as hardware alone. Furthermore, although aspects of the disclosed aspects are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules may be created using a variety of programming techniques. For example, program sections or program modules may be designed in or by means of Java, C, C++, assembly language, Perl, PHP, HTML, or other programming languages. One or more of such software sections or modules may be integrated into a computer system, computer-readable media, or existing communications software.

The present disclosure has been described in detail. However, it should be understood that the detailed description and specific examples, while indicating preferred aspects of the disclosure, are given by way of illustration only, since various changes and modifications within the scope of the disclosure will become apparent to those skilled in the art from this detailed description.

In addition, since the present disclosure described above may be substituted, modified and changed in various ways by those skilled in the art without departing from the technical idea of the present disclosure, the present disclosure is not limited by the aspects described above and the accompanying drawings, and all or some of the aspects may be selectively combined to enable various modifications.

EXPLANATION OF REFERENCE SIGNS

10: energy storage system
20: PCS
100: control container, first control container
101: second control container
110: BSC
120: master controller, first master controller
121: second master controller
130: BBMS, first BBMS
131: second BBMS
200: battery container
200a, 200b: battery container, first battery container
201a, 201b: second battery container
210: slave controller
210a, 210b: slave controller, first slave controller
211a, 211b: second slave controller
220a, 220b, 220c, 220d: RBMS, first RBMS
221a, 221b, 221c, 221d: second RBMS
300: watering container, first watering container
301: second watering container
600: computer architecture
602: computing system
604: processor
606: system memory
608: system bus
610: non-volatile memory
612: volatile memory
614: hard disk drive
616: magnetic floppy disk drive
618: removable magnetic disk
620: optical disk drive
624: HDD interface
626: FDD interface
628: optical drive interface
630: operating system
632: one or more application programs
634: other program modules
636: program data
638: keyboard
640: mouse
642: input device interface
644: monitor
646: video adapter
648: remote computer
640: memory/storage device 650
652: LAN
654: WAN
656: wire and/or wireless communication network interface or adapter
658: modem

What is claimed is:

1. A method of controlling an energy storage system, the energy storage system including:
    a control container including:
        a master controller;
        a bank battery management system (BBMS); and
        a battery system controller (BSC) connected to the master controller and the BBMS;
    a battery container including:
        a plurality of batteries;
        a slave controller; and
        a rack battery management system (RBMS); and
    a watering container fluidly connected to the first battery container,
    wherein the method comprises:
        receiving by the BSC, via a first communication line, from the slave controller, first battery information for the plurality of batteries;
        receiving, by the BSC, via a second communication line, from the RBMS through the BBMS, second battery information for the plurality of batteries;
        determining, by the BSC, based on the first battery information, whether a fire extinguishing fluid should be applied;
        in response to the BSC determining that the fire extinguishing fluid should be applied, instructing by the BSC to the master controller to send to the watering container, via a third communication line, instructions to cause the watering container to apply the fire extinguishing fluid to the plurality of batteries;
        determining, by the BSC, whether the first communication line has failed;
        in response to determining, by the BSC, that the first communication line has failed, determining, by the BSC, based on the second battery information, whether the fire extinguisher fluid should be applied; and
        in response to determining, by the BSC, that the fire extinguishing fluid should be applied, instructing by the BSC to the master controller to send, via the third communication line, instructions to cause the watering container to apply the fire extinguishing fluid to the plurality of batteries.

2. The method of claim 1, further comprising:
    sensing, by the RBMS, a temperature of a first battery; and in response to the first battery reaching a predetermined temperature, controlling, by the BSC, a pump of the watering container to pump fluid to the first battery.

3. The method of claim 2, wherein the control container includes at least one of following control elements: a HVAC (Heating, Ventilation and Air Conditioning), an uninterruptible power supply system (UPS), a door sensor, a fuse, a switch, a switching mode power supply (SMPS), a fire suppression system (FSS), a surge protection device (SPD) and an insulation monitoring device (IMD), and wherein the method further comprises controlling, by the master controller, the at least one of the control elements.

4. The method of claim 1, wherein the watering container comprises:

a temperature device configured to break when at least one of the plurality of batteries reaches a predetermined temperature; and
a pump.

5. The method of claim 1, wherein the watering container is connected to the master controller through the third communication line, the watering container being configured to output the fire extinguishing fluid to the plurality of batteries when a watering command is received from the master controller.

6. The method of claim 1, wherein the slave controller is connected to and controls at least one of following elements included in the battery container: a HVAC (Heating, Ventilation and Air Conditioning), an uninterruptible power supply system (UPS), a door sensor, a gas sensor, a smoke sensor, a switch, a switching mode power supply (SMPS), a damper, a fan and a fire suppression system (FSS).

7. The method claim 1, wherein the master controller is configured to receive battery container information from the slave controller, and wherein the BSC is configured to receive the battery container information from the master controller through the first communication line.

8. The method of claim 1, wherein the RBMS is configured to monitor states of the plurality of batteries, and wherein the RBMS is connected to a module battery management system (MBMS) through the second communication line.

9. The method of claim 1, wherein the BSC is connected to an external power conversion system (PCS) through the first communication line.

10. The method of claim 1, wherein the battery container and the slave controller are each provided in plurality, and wherein the master controller is connected to the plurality of slave controllers included in the plurality of battery containers through the first communication line.

11. The method of claim 10, wherein the master controller is directly connected to each of the plurality of slave controllers through the first communication line.

12. The method of claim 1, wherein the battery container and the RBMS are each provided in plurality, and wherein the BBMS is connected to the plurality of RBMSs included in the plurality of battery containers through the second communication line.

13. The method of claim 12, wherein the BBMS is serially connected to the plurality of RBMSs in a serial manner through the second communication line.

14. The method of claim 1, wherein the energy storage system further comprises another control container including:

another master controller connected to the BSC through the first communication line; and
another BBMS connected to the BSC through the second communication line.

15. The method of claim 14, wherein the energy storage system further comprises another battery container including:

another slave controller connected to the another master controller through the first communication line; and
another RBMS connected to the another BBMS through the second communication line, the another RBMS being configured to monitor a state of a corresponding battery in the another battery container.

16. The method of claim 15, wherein the energy storage system further comprises another watering container connected to the another master controller through the third communication line, the another water container being configured to output a fire extinguishing fluid therein to the corresponding battery in the another battery container when a watering command is received from the another master controller.

* * * * *